May 23, 1967     J. F. KOWALICK     3,320,793
LIQUID PROPELLANT PIEZOMETER
Filed April 5, 1965
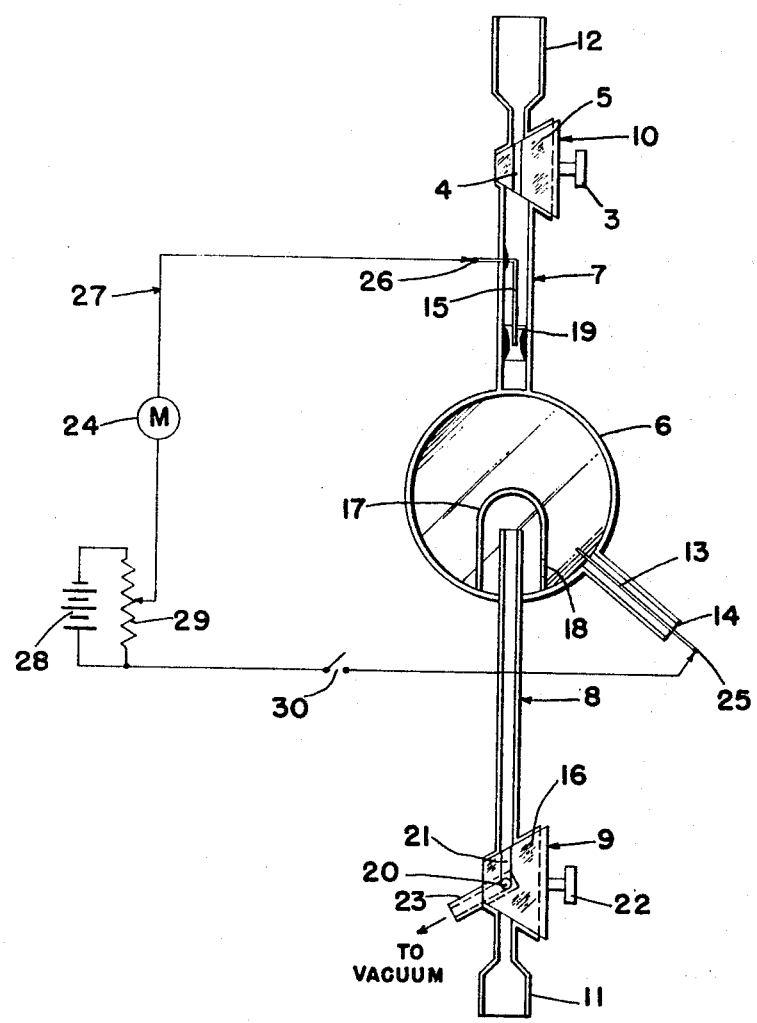
Inventor
JAMES F. KOWALICK
By Harry M. Saragovitz,
Edward J. Kelly, Herbert Berl
& S. Dubroff
                  Attorneys United States Patent Office 3,320,793
Patented May 23, 1967

3,320,793
LIQUID PROPELLANT PIEZOMETER
James F. Kowalick, Southampton, Pa., assignor to the United States of America as represented by the Secretary of the Army
Filed Apr. 5, 1965, Ser. No. 445,805
5 Claims. (Cl. 73—53)

ABSTRACT OF THE DISCLOSURE

A symmetrical glass piezometer for liquid propellants, which may be filled in one position and inverted for tests, is provided by a central hollow spherical body portion with two tubular conduit arms extending therefrom in opposite directions and communicating with the interior thereof, the one directly and the other through an interior liquid trap.

The outer ends of the conduits are enlarged to provide open-ended filling reservoirs and control valve means as part thereof. An electrode in a restriction in said one conduit arm and a second electrode in the body element provide for electrical measurement connections therewith. A connection for applying vacuum to fill the piezometer is provided on the valve in said other conduit arm.

---

The invention described herein may be manufactured and used by or for the Government for governmental purposes without the payment to me of any royalty thereon.

The present invention relates to piezometers or devices for measuring the compressibility of liquids, and more particularly to a type of piezometer for measuring the compressibility of hazardous liquids in accordance with the previously known method of Richards and Stull.

The method of Richards and Stull involves two separate determinations; one on a device filled with pure liquid mercury, and the other on the same device filled with a mixture of a relatively large amount of pure liquid mercury and a relatively small amount of the sample liquid. In both determinations the total liquid volume is the same. By this method, the hazard of using large quantities of explosive liquids is eliminated, but good accuracy is obtained through the use of a sizeable amount of mercury in each determination. By this method, the difference in compressibilities of the liquid mercury and the liquid in question can be determined.

This method is of particular value in solving the measurement of the compressibility of certain liquid monopropellants such as the alkyl nitrate family, since these compounds are quite sensitive to ignition of their vapors by adiabatic compression. The hazard created by their high energy characteristics rules out the use of any device requiring a considerable quantity of liquid. On the other hand, the error from leakage and mechanical difficulties involved in using a small amount of less than one or two cubic centimeters of the liquid sample in a compressibility determination can result in very poor accuracy.

In previous devices using this differential technique, the liquid sample was introduced into a glass device through an opening which was later sealed with a ground glass stopper. In many instances leakage would occur during compression through the stopper wall because the stopper was not finely ground or because the stopper surface did not match the joint surface. Also, in order to separate the sample liquids from the compressing gas, an unsymmetrical piezometer in the shape of a glass U-tube was used, the sample liquid being on the top of the closed arm of the U and the liquid mercury which is exposed to the compressing gas, occupying both arms. The lack of symmetry makes it more difficult to determine and maintain the position of the piezometer in the steel compression vessel which is usually a thick-walled cylinder, closed at both ends with a port for the compressing gas.

Therefore, it is an important object of this invention to provide an improved liquid piezometer which is more symmetrical than the U-tubed piezometer, while constructed of glass has no glass joints as a component part, may utilize a simplified filling technique, and which further permits the determination of small amounts of hazardous liquids of less than one cubic centimeter by the above mentioned differential technique.

It is also an object of this invention to provide an improved piezometer of the liquid propellant type, of glass construction, and which is readily adapted for laboratory work following simple operating procedures whereby, through simplification, accuracy may be enhanced.

The invention will further be understood from the following description, when considered in connection with the accompanying drawing, and its scope is pointed out in the appended claims.

In the drawing, the single figure is a side view, in cross-section, of a liquid propellant piezometer embodying the invention.

Referring to the drawing, a central body portion comprising a Pyrex or similar glass sphere or container 6 is provided with oppositely extending conduit arms of small tubing 7 and 8 communicating with the interior thereof. The two tubular arms 7 and 8 are preferably aligned coaxially on opposite sides of and extend radially from the sphere 6 as indicated in the drawing. The arms are preferably of glass tubing although they may be constructed of other materials suitable for use in piezometry.

The outer end of the conduit arm 7 is connected through a two-way stop-valve or stopcock 10 to a cylindrical open-ended filling reservoir 12 in continuation thereof. In a similar manner, the glass tubing or conduit arm 8, at the outer end thereof, is connected through a three-way stopcock or valve 9 to a filling reservoir of cylindrical open-ended construction as indicated at 11. While both valves may be of any suitable construction for conveying liquids under pressure each of the valves shown is provided with rotatable conical valve elements which seat smoothly and tightly into corresponding valve seats in the forms indicated, to provide tight-fitting joints. In the case of the two-way stopcock or valve 10 a rotary glass valve element 5 is provided with a through opening or conduit 4 and an operating knob or handle 3 as indicated. In the position shown, the valve is open or partially open to connect the filling reservoir 12 with the conduit arm 7 and the interior of the glass body 6. A 90° turn provides closure or cut-off between the reservoir and the conduit arm 7.

An elongated wire contact 13 which may be of tungsten or the like, communicates with the interior of the sphere through an elongated sealing tube 14 as indicated, and extends exteriorly thereof for receiving an electrical connection. A second wire contact 15 is located in the conduit arm 7 and is sealed to extend exteriorly thereof for a similar electrical connection as the contact wire 13. The contact wire 15 is provided with a finely poined tip and is coaxially centered in a relatively small (1.25 millimeters) capillary restriction or neck 19 in the conduit arm adjacent to the sphere or container 6.

Inside the sphere a tubular extension of the conduit tubing 8 is open ended an is enclosed by a liquid trap casing 17 of hemispherical shape and joined to the inner wall of the sphere to provide a seal. A circular opening 18 in the wall of the hemisphere liquid trap 17 permits fluid continuity from arm to arm of the liquid conducting path through the tubular arm elements 8 and 7 and through the Pyrex glass body 6. This connection is subjected to the constriction at the capillary element or neck 19.

A third port 20, in the rotary valve element 16 of the three-way stopcock 9, is connected with a tubular conduit 23 adapted for connection with a suitable vacuum source and has a short conduit arm 21 also in the valve element 16 and movable therewith to communicate with the conduit arm 8 or the filling reservoir 11 as will be further explained hereinafter. Like the stopcock or valve 10, the rotatable valve element 16 with its ports may be constructed of glass or other suitable material and provided with an operating knob or handle 22 for rotation.

The filling procedure consists first, of evacuating the piezometer through the port or opening 20 in the three-way valve 9, with the valve element 16 in the position shown, to provide a connection with the tubing or conduit arm 8 and the remainder of the piezometer, and closing off the connection with the filling reservoir 11. In this position the vacuum source is thus connected directly with the piezometer through the port 20 and the short conduit arm 21 in the valve element 16. Preferably the piezometer is evacuated to a pressure of less than 40 microns of mercury. With the piezometer being continuously evacuated, the two-way stopcock or valve 10 is partially opened such that the liquid mercury flows through the reservoir 12 into the glass sphere 6 from a source of supply. For this filling operation the piezometer is placed in the filling position to stand vertically 180° inverted from the position shown in the drawing. When the entire piezometer is filled, the three-way stopcock or valve 9 is turned to the position opening the filling reservoir 11 to the internal port 20 and the short conduit 23 of the valve element 16 communicating therewith. This involves turning the stopcock valve element 16, in the present example, 180° from the position shown. The piezometer is then inverted and the two-way stopcock or valve 10 is maintained open while the mercury is withdrawn from the arm 7 manually, or with a fine eye-dropper or the like, such that the mercury level finally just contacts the pointed tungsten tip of the contact 15.

Next the piezometer is centered in a pressure vessel partially filled with liquid mercury at a constant temperature by any suitable means and thereafter the Richards and Stull procedure for obtaining pressure volume data is followed. As this is known procedure and as explained in the text books and other sources such as "New Method for Determining Compressibility," Carnegie Institute of Washington, Rept. 7 (1903), for example, and the apparatus involved does not form part of this invention, further description is not deemed necessary.

For the case where another liquid is present in the piezometer with liquid mercury the only difference is the filling procedure is that, after the piezometer is completely filled with mercury and the two-way stop valve 10 is closed, the three-way stopcock 9 is opened and approximately 1 cubic centimeter of mercury is displaced from the neck 8 by the liquid under investigation. This transfer is accomplished with a fine eye dropper or the like. By closing the three-way valve 9 and inverting the piezometer, the liquid being less dense than mercury, rises in the arm or tube 8 and thence into the liquid trap 17 where it cannot come into contact with the compressing gas. Only liquid mercury must be in contact with the tungsten wire tip or contact 15 since the purpose of this contact is to indicate when the mercury moves below the tip thereof. This may be accomplished by connecting an ohmeter 24 or the like sensitive current indicator between the outer terminals 25 and 26 of the contacts 13 and 15 respectively, in a suitable supply circuit 27 having a battery or like current source 28 for the meter, with control switch 29 and control potentiometer 30. It is then noted whether the resistance is zero (full current indication) thereby indicating that the mercury is contacting the tip, or infinite (zero current indication), indicating that the mercury is below the tip. If the non-conducting liquid sample were in the arm 7 in the vicinity of the wire tip 15, the meter 24 would always indicate a very large resistance (low current reading), whether or not the liquid sample is contacting the tungsten wire 13.

As referred to above, the piezometer is again centered in the pressure vessel and the procedure of Richards and Stull is followed in the usual manner.

From the foregoing description it will be seen that the liquid propellant piezometer provided in accordance with the present invention may be of simplified Pyrex or similar glass construction. It may also be more symmetrical than the U-tube potentiometer while in addition it has no glass joints as a component part thereof and utilizes a simplified filling technique. This permits the determination of small amounts of hazardous liquids less than 1 cubic centimeter and still utilizes the advantages of the differential technique of Richards and Stull. The piezometer also has an advantage in that the symmetry makes it more readily useable while further being adapted for positioning in the steel compression vessel. This is usually a thick-walled cylinder closed at both ends with a port for the compressing gas and following the Richards and Stull procedure. The glass U-tube or similar form of piezometer is more difficult to utilize with this type of cylinder because the liquid in both arms is exposed to the compressing gas.

From the foregoing description it will further be seen that a piezometer in accordance with the invention is adapted to measure the compressibility of certain liquid monopropellants such as the alkyl nitrate family, since these compounds are quite sensitive to compression-ignition of their vapors and thus create a definite hazard by their high energy characteristics if used in any considerable quantity. In the present equipment the error from leakage and mechanical difficulties involved in using a small amount of liquid is considerably less than with apparatus of this type formerly available resulting in much greater accuracy.

I claim:

1. A liquid propellant piezometer comprising in combination, a central hollow body portion having two tubular conduit arms extending therefrom in substantially opposite directions and communicating with the interior thereof, an inner casing providing a liquid trap enclosure within said body portion for the inner end of a first of said conduit arms and having an opening in a wall thereof communicating with the interior of said body portion, means providing a capillary restriction in the second and opposite conduit arm, a pointed contact wire extending into said capillary restriction and having a sealed external terminal, a tubular filling reservoir connected with said second conduit arm and capillary element, two-way control valve means connected in said second conduit arm between said reservoir and said restriction means, a second tubular filling reservoir connected with the first conduit arm and communicating therewith, three-way valve means in said connection providing selective flow control therefor, said valve means having an outlet port provided with a conduit for connection with a vacuum source and a rotatable valve element providing said port and having a second radial conduit element adapted for rotation into connection with said last named tubular conduit or said last named filling reservoir selectively, and a second contact wire extending to the interior of the body portion and having an external seal and terminal, said terminals providing connections for electrical resistance measurements in determining a liquid level in the capillary element.

2. A liquid propellant piezometer as defined in claim 1, wherein the tubular conduit elements in connection with the central body portion are in alignment and in prolongation one of the other, and wherein the filling reservoirs are similarly in prolongation and alignment with the respective conduit connections provided therefor, whereby said piezometer is adapted for use in following the Richards and Stull procedure for determining the compressibility of the liquids contained therein.

3. A liquid propellant piezometer as defined in claim 1 wherein the piezometer is constructed entirely of glass including the valve element and wherein the contact wires are constructed of tungsten.

4. A piezometer device for measuring the compressibility of liquid propellants of the hazardous high-energy type sensitive to vapor ignition and precluding use in any considerable quantity for such measurements and comprising in combination, two tubular open-ended filling reservoirs at opposite ends thereof, a central hollow body, two elongated tubular conduit elements connecting the interior of the body with said end reservoirs, said reservoirs and conduit connections being non-metallic and aligned with said body on a common longitudinal axis to provide an elongated tubular structure, a liquid trap within the central body surrounding the inner end of a first one of said conduit elements and having a circular orifice opening in one wall thereof communicating with the interior of said central body, means providing a control valve in said last-named conduit element between said central body and the associate filling reservoir and being substantially adjacent to said reservoir, said control valve means providing outlet connections from the tubular conduit element and from said filling reservoir selectively for applying exhaust vacuum thereto, means providing a second control valve in the second and opposite conduit element adjacent to the filling reservoir thereof, means providing a capillary restriction in the last named conduit element adjacent to the central body, and a pair of metallic contacts extending one into the interior of the central body and the other longitudinally into said capillary element to provide operational resistance measurement contact with liquids in said central body.

5. A piezometer device as defined in claim 4, wherein the first control valve means is of the three-way type having a rotatable tapered valve element providing interior conduit connections therethrough for effecting said selective control operation, and wherein the second control valve means is of the two-way type having a rotatable valve element providing off and on operation and control therethrough.

References Cited by the Examiner

Cornish et al.: "Technique for Measurement of Specific Volume of Liquids at High Pressures and Temperatures," Rev. Scientific Instruments, vol. 30, No. 7, July 1959, pages 565–567 (73–53).

DAVID SCHONBERG, *Primary Examiner.*